Patented Oct. 8, 1940

2,216,754

UNITED STATES PATENT OFFICE 2,216,754

TREATMENT OF SUGAR SOLUTIONS

Pedro Sanchez, Habana, Cuba, and Eugene N. Ehrhart, New York, N. Y., assignors to Sucro-Blanc, Inc., New York, N. Y.

No Drawing. Application October 1, 1938, Serial No. 232,876

2 Claims. (Cl. 127—53)

The present invention relates to the clarification of sugar solutions containing finely divided carbon by treatment thereof with a floc forming material capable of collecting and holding the carbon so that the floc and collected carbon can be conveniently removed from the main body of the solution without filtration.

Heretofore in decolorizing sugar solutions, finely divided activated vegetable carbons have been added in relatively small quantities, for instance, from about 1 to 2% based on solids, the activated carbon absorbing certain coloring matters in the sugar solution. Due to the fine state of subdivision of the activated carbon, difficulty was encountered in removing the carbon from the solution. These problems were mainly problems of filtration, and, in many instances, even where excessive quantities of filter-aids were employed in the filtration, complete removal of the more finely divided carbon was not effected.

It is an object of the present invention to provide a procedure for clarifying sugar solutions containing finely divided activated vegetable carbons in which the difficulties of filtration are eliminated.

It is a still more specific object of the present invention to provide a method of collecting the carbon in a floc forming material and of inducing agglomeration of the floc so that ready separation of the decolorized and clarified solution and agglomerate of floc and collected carbon, can be effected.

In accordance with the procedure of the present invention the solution of sugar is treated with a sufficient quantity of activated or vegetable carbon to effect the treatment desired in the solution, is then treated with a sufficient quantity of floc forming material which when agglomerated will collect and hold the carbon. The quantity of floc forming materials employed will be dictated by the nature of the sugar solution and the quantity of carbon used in the treatment. For treatment of an affined sugar solution of approximately 99 purity, 0.5%, more or less, of carbon, and 0.1%, more or less, of floc forming chemicals will be found sufficient. The treatment of the solution with the carbon is effected in the usual fashion, as, for instance, by agitation to insure good contact of the solution and activated carbon. In order to clarify the solution by collecting the added carbon, floc forming materials are introduced into the solution to react therein, with the production of an insoluble material. Upon stirring the incipiently precipitated material, the floc encloses and holds the finely divided particles of carbon and as the floc agglomerates the insoluble material and collected carbon rises to the top of the solution with the production of a clear and brilliant clarified syrup. The main bulk of solution can then be separated from the agglomerate without the necessity of filtration.

As floc forming materials there may be employed any suitable substances capable of reacting in sugar solutions with the production of a material insoluble therein, for instance, lime and a soluble phosphate, lime and phosphoric acid, aluminum or iron salts and suitable alkaline material, for instance, sodium aluminate, or other well known floc forming substances.

Carrying out the usual procedure with carbon and subsequent filtration of the solution and carbon, it was found that on treating a washed raw Cuban sugar of 60 Brix with 0.8% carbon, the filtration of the treated solutions even with addition of 0.5% filter-aid was slow and after filtration the liquor had to be again filtered through a precoated filter to remove the colloidal carbon contained in it.

As a comparative and specific example, purely illustrative of the principles of, but not limitative of, the invention, a solution of the same raw Cuban sugar, but of 68 Brix, was treated under the same conditions with 0.8% of the carbon. Thereafter 0.15% of aluminum chloride and 0.1% sodium aluminate, based on solids, were added and the solution again stirred. The solution now contained the finely divided activated carbon together with a precipitate of hydrous aluminum oxide. The solution was then aerated. Without agitation the aerated solution was then heated slowly and uniformly to a temperature of 210° F. During the heating period convection currents in the solution cause a gradual upward movement of the floc and entrapped carbon. The flocculating particles gradually increased in size and collected upon the top of the solution. This scum amounted to 10 to 15% of the volume of the solution treated, the remainder of the solution being brilliantly free of any carbon particles. The clarified syrup was drawn off from the scum and filtered through a precoated filter, this operation being solely a check filtration, eliminating the need of addition of filter-aid necessary in the case above.

The floc, together with the collected carbon was then diluted and filtered separately, this filtrate being used to dissolve further sugar or for other purposes.

In aerating the solution, any procedure capable of entraining air in small bubble form in the solution may be employed as, for instance, the jet or impact method, provided sufficient air be dispersed in the mixture so that upon heating the same, the agglomerated floc and trapped carbon are carried to the surface.

From the foregoing it will be seen that the present invention comprehends the removal from sugar solutions of activated or vegetable carbon wherein the necessity of filtration with filter-aid is eliminated.

What is claimed is:

1. The process of removing finely divided carbon from a sugar solution without filtering the same which comprises aerating a solution containing floc forming materials and finely divided carbon, thereafter heating the solution to a temperature sufficient to raise the floc and collected carbon to the surface of the solution and then separating the clarified solution from the floc and carbon by drawing off the clarified solution whereby the solution is simultaneously clarified and decolorized.

2. The process of removing finely divided carbon from a sugar solution without filtering the same which comprises aerating a solution containing floc forming materials and finely divided carbon, thereafter heating the solution to about 210° F. until the floc and collected carbon form a scum upon the surface of the solution and then separating the clarified solution from the scum by drawing off the clarified solution whereby the solution is simultaneously clarified and decolorized.

PEDRO SANCHEZ.
EUGENE N. EHRHART.